(12) United States Patent
Rockenfeller et al.

(10) Patent No.: US 10,584,944 B2
(45) Date of Patent: *Mar. 10, 2020

(54) BURST MODE COOLING SYSTEM

(71) Applicant: Rocky Research, Boulder City, NV (US)

(72) Inventors: Uwe Rockenfeller, Boulder City, NV (US); Kaveh Khalili, Boulder City, NV (US)

(73) Assignee: ROCKY RESEARCH, Boulder City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,145

(22) Filed: Mar. 6, 2017

(65) Prior Publication Data

US 2018/0252447 A1  Sep. 6, 2018

(51) Int. Cl.
*F25B 17/10* (2006.01)
*F41H 13/00* (2006.01)
*B01J 20/02* (2006.01)
*B01J 20/04* (2006.01)
*F25B 17/08* (2006.01)
*F25B 49/04* (2006.01)
*F25B 35/04* (2006.01)
*F41A 13/12* (2006.01)

(52) U.S. Cl.
CPC ...... *F41H 13/0043* (2013.01); *B01J 20/0222* (2013.01); *B01J 20/0288* (2013.01); *B01J 20/046* (2013.01); *F25B 17/08* (2013.01); *F25B 35/04* (2013.01); *F25B 49/046* (2013.01); *F41A 13/12* (2013.01); *F41H 13/005* (2013.01)

(58) Field of Classification Search
CPC .......... F25B 25/02; F25B 17/08; F25B 41/04; F25B 49/046; F25B 2600/2515; F25B 49/04; F25B 35/04; F25B 39/026; F25B 30/04; F28D 7/106; F28D 21/0003; F28D 20/0034; F28F 1/30; F01N 5/02; Y02E 60/142; B01J 20/046; B01J 20/0222; B01J 20/0288; F41H 13/00436
USPC .......................................... 62/79, 129, 476
See application file for complete search history.

(56) References Cited

U.S. PATENT DOCUMENTS

| 1,916,028 | A | * | 6/1933 | Willsie ................... F25B 17/00 62/142 |
| 2,050,959 | A | * | 8/1936 | Normelli ................ F25B 17/08 62/144 |
| 4,231,849 | A | * | 11/1980 | Hutchinson .......... C07D 307/18 205/427 |
| 4,505,123 | A | * | 3/1985 | Kusakabe ............... F25B 15/00 62/148 |
| 4,848,994 | A |  | 7/1989 | Rockenfeller et al. |
| 5,161,389 | A |  | 11/1992 | Rockenfeller et al. |

(Continued)

OTHER PUBLICATIONS

International Search Report and Written Opinion dated Mar. 1, 2018 in PCT Application No. PCT/US18/17172.

*Primary Examiner* — Jianying C Atkisson
*Assistant Examiner* — Paul S Schwarzenberg
(74) *Attorney, Agent, or Firm* — Knobbe, Martens, Olson & Bear LLP

(57) ABSTRACT

Disclosed are systems and methods of rapidly cooling thermal loads by providing a burst mode cooling system for rapid cooling. The burst mode cooling system may include a complex compound sorber configured to rapidly absorb ammonia.

39 Claims, 6 Drawing Sheets

(56) References Cited

U.S. PATENT DOCUMENTS

| | | | | |
|---|---|---|---|---|
| 5,231,849 A | * | 8/1993 | Rosenblatt | B60H 1/3201 62/238.3 |
| 5,279,359 A | * | 1/1994 | Erickson | F25B 17/086 165/104.12 |
| 5,335,510 A | * | 8/1994 | Rockenfeller | F25B 17/083 62/106 |
| 5,664,427 A | * | 9/1997 | Rockenfeller | B01D 53/34 423/299 |
| 6,006,527 A | * | 12/1999 | Hansen | F25B 5/02 236/75 |
| 6,224,842 B1 | * | 5/2001 | Rockenfeller | C09K 5/047 423/352 |
| 9,211,493 B2 | * | 12/2015 | Applegarth | B01D 53/0476 |
| 2004/0101457 A1 | * | 5/2004 | Pahlman | B01J 20/06 423/50 |
| 2010/0157525 A1 | | 5/2010 | Ullman et al. | |
| 2013/0047639 A1 | * | 2/2013 | Stannard | B60H 1/3201 62/79 |
| 2015/0143806 A1 | | 5/2015 | Friesth | |
| 2016/0238286 A1 | | 8/2016 | Rockenfeller et al. | |

\* cited by examiner

BURST MODE COOLING SYSTEM

BACKGROUND

Field of the Invention

This disclosure relates generally to sorption refrigeration systems using sorbers and with complex compounds and a sorber gas that are configured to provide rapid cooling features. In particular, features for a rapid pulldown of a thermal load, for example for flash freezing or cooling a fast-rising heat load.

Description of the Related Art

Adsorption/desorption or also referred to as absorption/desorption reactions between polar gases and certain metal salts yield complex compounds which are the basis for efficient refrigeration, thermal storage, heat pump systems and power systems having high energy density. However, energy density, a measure of the quantity of polar gas adsorbed on the salt, which translates into the amount of work or energy which can be stored in a given amount of the complex compound, is only one parameter to be considered in designing commercially attractive systems.

Of significance, if not greater importance, are the reaction rates between the gas and the complex compound, which result in the time it takes to adsorb and desorb a given amount of the gas into or from the complex compound. Increased or maximized reaction rates result in increased or improved power that can be delivered by the system, i.e., more energy delivered over a period of time, which translates into a greater heating, cooling or power capability of the system.

The reaction rates in these systems are partly a function of how efficiently the gas is distributed to the complex compound. Previous systems have used porous ceramics or cloth to distribute gas to the complex compound. However, the ceramic distributors are fragile and can fracture easily, especially in non-stationary or vibratory environments. For example, ceramic distributors can have difficulty withstanding the vibrations caused by transportation in rough terrain. Cloth distributors have also been found to have some downsides, particularly due to their propensity to clog after multiple cycles. This clogging can increase the pressure drop of the refrigerant in the systems and thereby reduce the performance of the sorber and the absorption system.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for distributing gas in complex compound reactors.

One embodiment is a burst mode ammonia based cooling system that includes: at least one sorber comprising a complex compound sorbent configured to absorb and desorb ammonia; at least one heat source thermally connected to the at least one sorber; one or more condensers in fluid communication with the at least one sorber; one or more an evaporators in fluid communication with the at least one sorber; and a burst mode controller configured to activate a valve to provide a burst of heat absorption at the evaporator, where the absorption period of the complex compound is between 5 seconds and 300 seconds and the desorption period is between 180 seconds and 15 minutes.

Another embodiment is a method in a complex compound sorber system of burst mode cooling a thermal load. The method includes: detecting when to activate a burst mode cooling cycle; activating a valve that allows ammonia to flow into at least one sorber comprising a complex compound sorbent, wherein the sorber is connected to an evaporator and the activation provides a burst of heat absorption at the evaporator; and controlling the absorption period of the complex compound to between 5 seconds and 300 seconds and the desorption period to between 180 seconds and 15 minutes.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Figure 1:
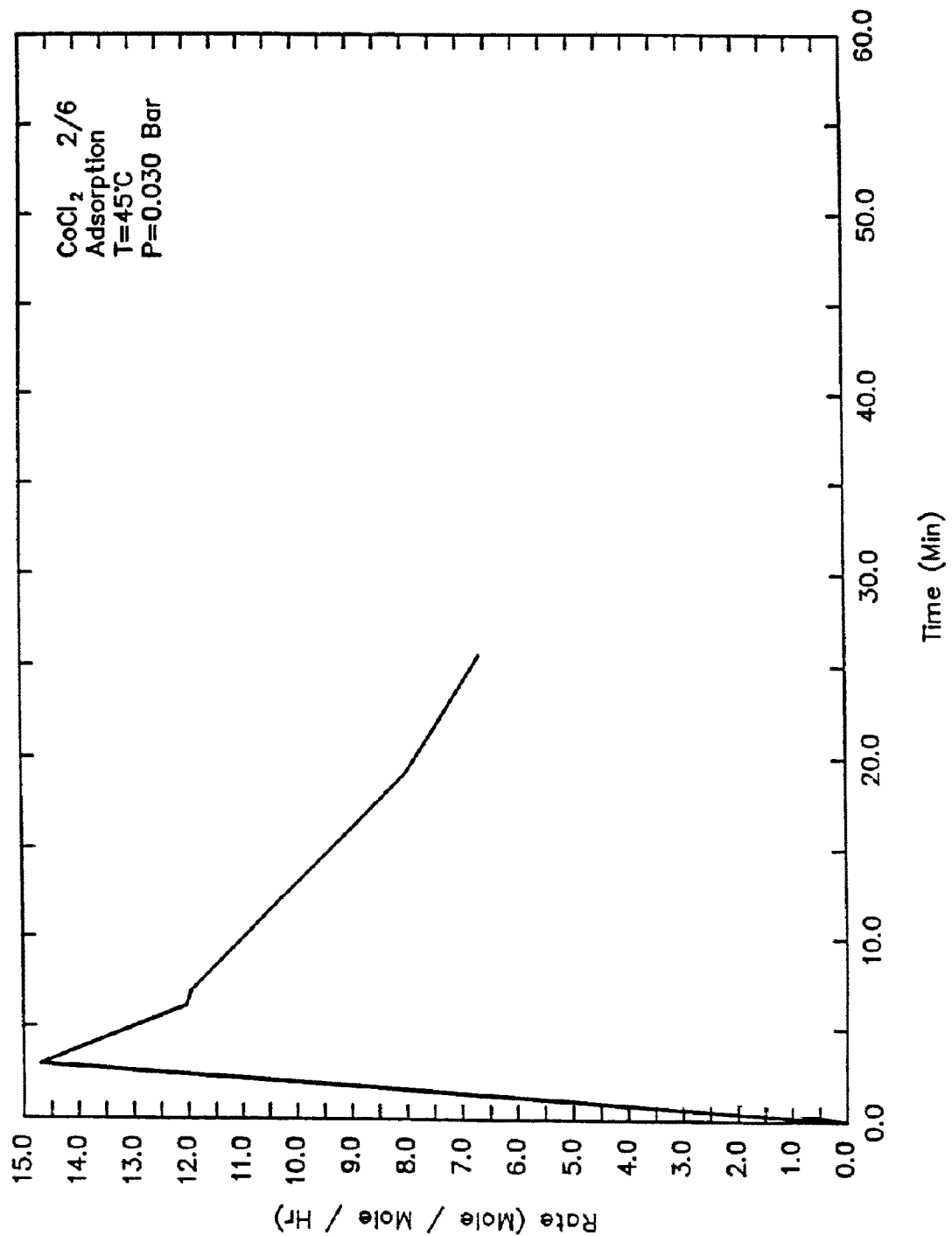
FIG. 1 is a line graph showing the absorption rate of ammonia onto $CoCl_2$ over time and shows that the absorption rate at the lean end of the coordination sphere, approximately the first up to about five minutes of the reaction, is much faster than outside the lean end of the coordination sphere.

Systems and methods are disclosed for rapidly cooling products, devices or other heat loads. Such systems use an ammonia gas sorption system linked to an evaporator to rapidly cool the target product or device. Solid-gas sorption reactions, i.e., adsorption and desorption of the gas on the solid, may be carried out under conditions and in an apparatus intended to yield high power densities. In one embodiment the adsorption period and the desorption period are at different rates to maximize the power density and rapid cooling characteristics of the sorber system.

In one example, the burst mode cooling system is part of a rapid cooling system for flash freezing products. In flash freezing, a product is brought from one temperature to a second temperature below freezing in a short period of time. In the food industry, flash freezing is performed to maintain the quality of the frozen food. Any other uses, where rapid cooling is desired, is contemplated within this application. Such cases include rapidly heating electronics and laser elements.

Because solid-gas sorption systems operate by adsorbing gas onto the solid complex compounds and then driving the absorbed gas off the complex compound through heating, they may be run on a myriad of energy types. For example, the system may be heated by fossil fuels, such as diesel or JP-8, electricity, natural gas, solar thermal or any other type of heating system that has enough thermal power to drive the ammonia gas from the complex compound sorbent.

In order to provide the relatively fast absorption rates contemplated by the burst mode cooling system, the system may use one specific complex compound and refrigerant, such as phase change ammonia. In one embodiment, the complex compound sorbent is $CaCl_2$, $MgCl_2$, $CoCl_2$, $FeCl_2$, $SrBr_2$, $SrCl_2$, $CaBr_2$ or $MnCl_2$ in combination with ammonia ($NH_3$) as the refrigerant. However, it should be realized that the complex compound may be selected from the following groups of salts:

(1) an alkaline earth metal chloride, bromide or chlorate salt, (2) a metal chloride, bromide or chlorate salt in which the metal is chromium, manganese, iron, cobalt, nickel, cadmium, tantalum or rhenium, (3) a double chloride salt selected from $NH_4AlCl_4$, $NaAlCl_4$, $KAlCl_4$, $(NH_4)_2ZnCl_4$, $(NH_4)_3ZnCl_5$, $K_2ZnCl_4$, $CsCuCl_3$, and $K_2FeCl_5$, (4) sodium bromide or ammonium chloride, and (5) transition metal halides, including zinc chloride.

Other complex compounds can be found in U.S. Pat. No. 4,848,994 issued on Jul. 18, 1989 and incorporated by reference herein for all purposes.

As described below, the system may be configured by an electronic controller to provide a burst discharge for cooling a device or product in a very short period of time. In one embodiment, each absorption period, which provides the burst cooling of the complex compound may be between 5 seconds and 300 seconds. Food process cooling is typical at the high end of the time range while cooling of heat generating laser systems, microwaves, etc. can be at the short or high end. In other embodiments, the absorption period may be between 10-200, 15-150, 20-100, 30-75 or 40-50 seconds. In other embodiments, the absorption period may be less than 200, 175, 150, 125, 100, 75, 50, 25, 10, 15, 7, or 5 seconds long. The absorption period may also be divided into multiple "pulse periods". For example, one absorption period of 25 seconds may be made up of three pulses of absorption for five seconds each, with a five second rest between each pulse. Other numbers of pulses within the absorption period, or number of rest periods are also contemplated. For example, the number of pulses within an absorption period may be 2, 3, 4, 5, 6, 7, 8, 9, 10, 11, 12, 13, 14, 15 or more pulses per absorption period. The pulse periods may be between 5-10, 5-20 or 5-30 seconds long each in some embodiments.

The controller may be configured in many ways to activate a burst mode cooling cycle. In one embodiment, the controller is any electronic device or apparatus that activates, modulates, or deactivates the flow of refrigerant or heat transfer fluids in the system. The controller may also be any electronic device or apparatus that controls heat at a burner within the system. In one embodiment, the controller is linked to a temperature sensor and activates a burst mode cooling cycle when the temperature sensor reaches a predetermined target temperature. The temperature sensor may be thermally linked to the thermal load being cooled to that when the thermal load reaches the predetermined target temperature, a cooling cycle is begun. Alternatively, the controller may be electronically linked to an activation signal that triggers a burst mode cooling cycle. The activation signal may be controlled by a predictive process that senses a variety of data and then predicts when to activated a cooling cycle. For example, the controller may sense the present temperature of the thermal load, the time since the last activation, and the state of other equipment of devices linked to the thermal load. Using this data, the system may activate a burst mode cooling cycle just before the thermal load starts to heat. For example, if the thermal load is a flash freezing system, the controller may detect when the system may need to begin freezing food or other products. Just prior to the freezing cycle being needed, the system initiates a burst of cooling so that the thermal load is cooled at the appropriate time. In some embodiments, the controller may activate a cooling cycle 1, 2, 3, 4, 5, 6, or 10 seconds in advance of a determined cooling event.

Using the lean end of the coordination sphere yields faster rates of absorption with the option of pulsing within each absorption period resulting in even faster burst reaction rates. As used herein the coordination sphere is a central metal ion and its coordination ligands, in the subject coordination sphere, but not counting ligand molecules of a possible lower coordination sphere. In one embodiment the lean end of the coordination sphere is the lower 50% of the subject coordination sphere where less than 50% of the possible coordinating ligands, such as ammonia, are bound to the central metal ion. In other embodiments, the lean end of the subject coordination sphere may be the lower 30%, 25% or 20% of the coordination sphere. For example, the highest rates of ammonia absorption are when the complex compounds in the sorber have the most absorption sites available for bonding to ammonia molecules. $SrCl_2$ has eight available absorption sites for ammonia. The first coordination sphere is the 0-1 sphere, the second is the 1-8 sphere, the latter being of interest in the majority of embodiments of to the subject matter of this disclosure. The 0-1 and 1-8 spheres are the theoretical numbers not accounting for solid-solid solution effects that narrow the window of thermodynamic monovariancy. In the case of $SrCl_2$, the effective range of monovariancy in which the vapor pressure is independent of the ligand concentration is about 1.8-7.5. Thus, the time required for a mole of $SrCl_2$ to go from 1.8 mole of absorbed ammonia to 2.8 moles of ammonia in that second coordination sphere is much shorter than for one mole of $SrCl_2$ to go from 2.8 moles of absorbed ammonia to 3.8 moles of absorbed ammonia. However, in certain lower temperature ambient conditions, particularly less than 20° C., it may be preferable to start with less than 1.8 moles of ligand, and start the absorption within the 0-1 sphere, the first coordination sphere. For $SrCl_2$, the lean end of the coordination sphere may be the lower 20% of the coordination sphere. This is similar for the majority of other compounds. Embodiments of the burst mode cooling system described herein are tuned to keep the complex compounds in the sorber at their leanest, with the fewest number of moles of ammonia, in order to allow higher reaction rates and resulting shorter reaction times for each absorption reaction, thus providing higher cooling power.

In one embodiment, the system is designed to absorb ammonia in the "leanest" portion of each complex compound's absorption profile. Thus, in embodiments of this system, if $SrCl_2$ is the compound, and each mole of $SrCl_2$ is capable of absorbing eight moles of ammonia, the system will be configured to have an absorption cycle that preferably absorbs ammonia when 3.5 or three or less moles of ammonia are absorbed to each mole of $SrCl_2$. If more than three moles of ammonia are absorbed onto each mole of $SrCl_2$ then the controller may instruct the system to perform a sorber heating cycle to drive off the bound ammonia and reset the complex sorbent to be back into its preferred range of fewer than three moles of ammonia per mole of $SrCl_2$ for another round of burst mode cooling.

Similarly, if $MnCl_2$ is the sorbent and can absorb up to six molecules of ammonia for each molecule of $MnCl_2$ with the relevant coordination sphere being the 2-6 mole sphere, then the system will be configured to have an absorption cycle to preferably absorb ammonia only when each mole of $MnCl_2$ has about 3.5, 3 or fewer moles of absorbed ammonia molecules, absorbing from about 2 moles of ammonia per mole of $MnCl_2$ to 3.5 moles of ammonia per mole of $MnCl_2$.

If $CaBr_2$ is the sorbent then the system may be configured to have an absorption cycle wherein ammonia is absorbed onto the $CaBr_2$ sorbent when less than about 3.5 moles of ammonia are already bound, absorbing from about 2 moles of ammonia per mole of $CaBr_2$ to 3.5 moles of ammonia per mole of $CaBr_2$. In some embodiments, the system may be configured to only absorb ammonia onto a $CaBr_2$ sorbent when there are less than about 3 moles of ammonia already bound to the $CaBr_2$ sorbent. These configurations can be managed by using the controller to tune the adsorption and desorption times to be active when the compound can be loaded with ammonia most efficiently.

In one embodiment, the temperature change/desorption period may be between about 180 seconds and about 15 minutes in order to reload the system. In some embodiments, the desorption period is less than about 5, 4, or 3 minutes, or less.

FIG. 1 shows the results of an experiment wherein the rate (mole/mole/hr) of ammonia bonding to a $CoCl_2$ sorbent in a heat exchanger was measured over time at a pressure of 0.030 Bar and a constant temperature of 45° C. It was found that the rate of ammonia absorption was much faster during the initial reaction when $CoCl_2$ was at the lean end of the coordination sphere and few moles of ammonia were bound to each mole of $CoCl_2$. As shown, after about the first four minutes of absorption the rate reached over 14.5 moles of ammonia being added to each mole of $CoCl_2$ per hour. However, after the first about four minutes, the rate of ammonia addition started to decrease as ammonia bonding positions on each mole of $CoCl_2$ were taken up by earlier reactions. Higher differential temperatures and pressures yield much higher rates, but the ratio of reaction rates between the lean and rich end of the coordination sphere either remains the same or gets even more pronounced.

Figure 2:
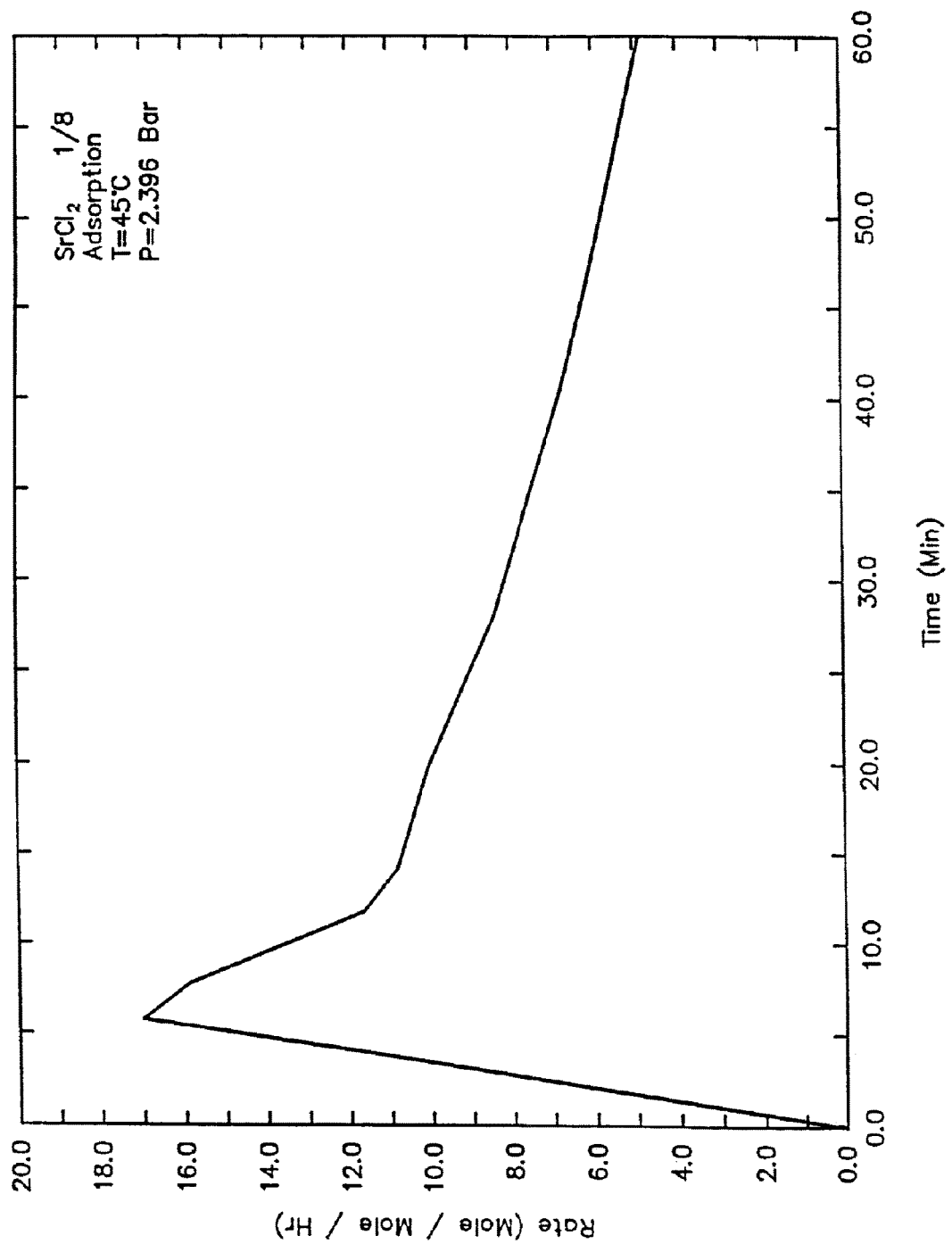
FIG. 2 is a line graph showing the absorption rate of ammonia onto $SrCl_2$ over time and shows that the absorption rate at the lean end of the coordination sphere, approximately the first up to about five minutes of the reaction, is much faster than outside the lean end of the coordination sphere.

FIG. 2 shows the results of an experiment wherein the rate (mole/mole/hr) of ammonia bonding to a $SrCl_2$ sorbent in a heat exchanger was measured over time at a pressure of 2.396 Bar and a constant temperature of 45° C. It was found that the rate of ammonia absorption was much faster during the initial reaction when $SrCl_2$ was at the lean end of the coordination sphere and few moles of ammonia were bound to each mole of $SrCl_2$. As shown, after about the first six minutes of absorption the rate reached over 17 moles of ammonia being added to each mole of $SrCl_2$ per hour. However, after the first about six minutes, the rate of ammonia addition started to decrease as ammonia bonding positions on each mole of $SrCl_2$ were taken up by earlier reactions. As is the case with all complex compounds of this material class, higher differential temperatures and pressures yield much higher rates, but the ratio of reaction rates between the lean and rich end of the coordination sphere either remains the same or becomes even more pronounced.

Optimum reaction rates for embodiments are also dependent on a number of independent parameters including adsorbent density, the mass diffusion path length, the heat or thermal diffusion path length, as well as the thermodynamic operating conditions. The latter include the overall process conditions i.e., the specific temperature and pressure conditions in which the process is carried out, the differential pressure or i.e., the difference between the operating or system pressure and the equilibrium pressure of the complex compound, and the approach temperature or $\Delta T$. One consequence of performing adsorption and desorption reactions at relatively fast speeds to provide burst cooling is that the approach temperature may be higher than normal. In embodiments of the invention, the approach temperature may be from 15° K and 35° K to cause a faster desorption of the ammonia.

In one embodiment, when the reactor is configured with an approach temperature for desorption of the ammonia at relatively high temperatures of 15° K and 30° K, the system may stop heating prior to the end of the desorption cycle. For example, the controller may instruct the system to stop heating the desorber 2, 3, 4, 5, 10, 20, 30 or more seconds before the desorption reaction is ending. This allows the ammonia to continue to desorb from the complex compound, but also allows the desorber to being cooled in order to get ready for the next round of absorption. The embodiment allows the desorber to begin cooling in advance of the next refrigeration cycle in the system and provides a higher overall efficiency in cycling the sorber for the next round of burst mode cooling.

In one embodiment the sorber is also configured to stop being cooled in advance of the end of the absorption cycle in order to prepare the sorber for the next cycle of heat. For example, the controller may stop circulating cooling fluid to the sorber 2, 3, 4, 5, 10, 20, 30 or more seconds before the reaction is ending. In one embodiment, the cooling loop of the system often comprises glycol and water or other suitable heat transfer fluids that may be turned off in order to allow the absorber rise in temperature before the next reaction cycle begins. In other embodiments, the cooling loop may use ammonia or other phase change fluid to cool the sorber.

Generally, the reactor should be designed to have a relatively low thermal mass. A reactor with more thermal mass takes longer to heat up and cool down. Embodiments of this invention include reactors that can provide efficient bursts of cooling, which means that the ability to rapidly heat and cool are one consideration of the reactor design. One way to measure the thermal mass is the ratio of the total weight in kilograms of the reactor (including shell, fins, complex compounds, etc.) to the weight in kilograms of the complex compounds (salt) within the reactor. In one embodiment, this ratio is less than 7:1 and more preferably less than 6:1, 5:1, 4:1 or 3:1. In one embodiment, the thermal mass of the reactor is reduced by manufacturing portions of the reactor out of advanced materials such as aluminum, titanium, advanced fiber composites, or other similar lightweight materials.

Embodiments may be part of a system configured to cool devices such as directed energy weapons systems, such as laser, electro-laser and microwave systems which rapidly heat when activated. Embodiments could also be part of rapid freezing systems for any industry such as the food and beverage industries.

Figure 3:
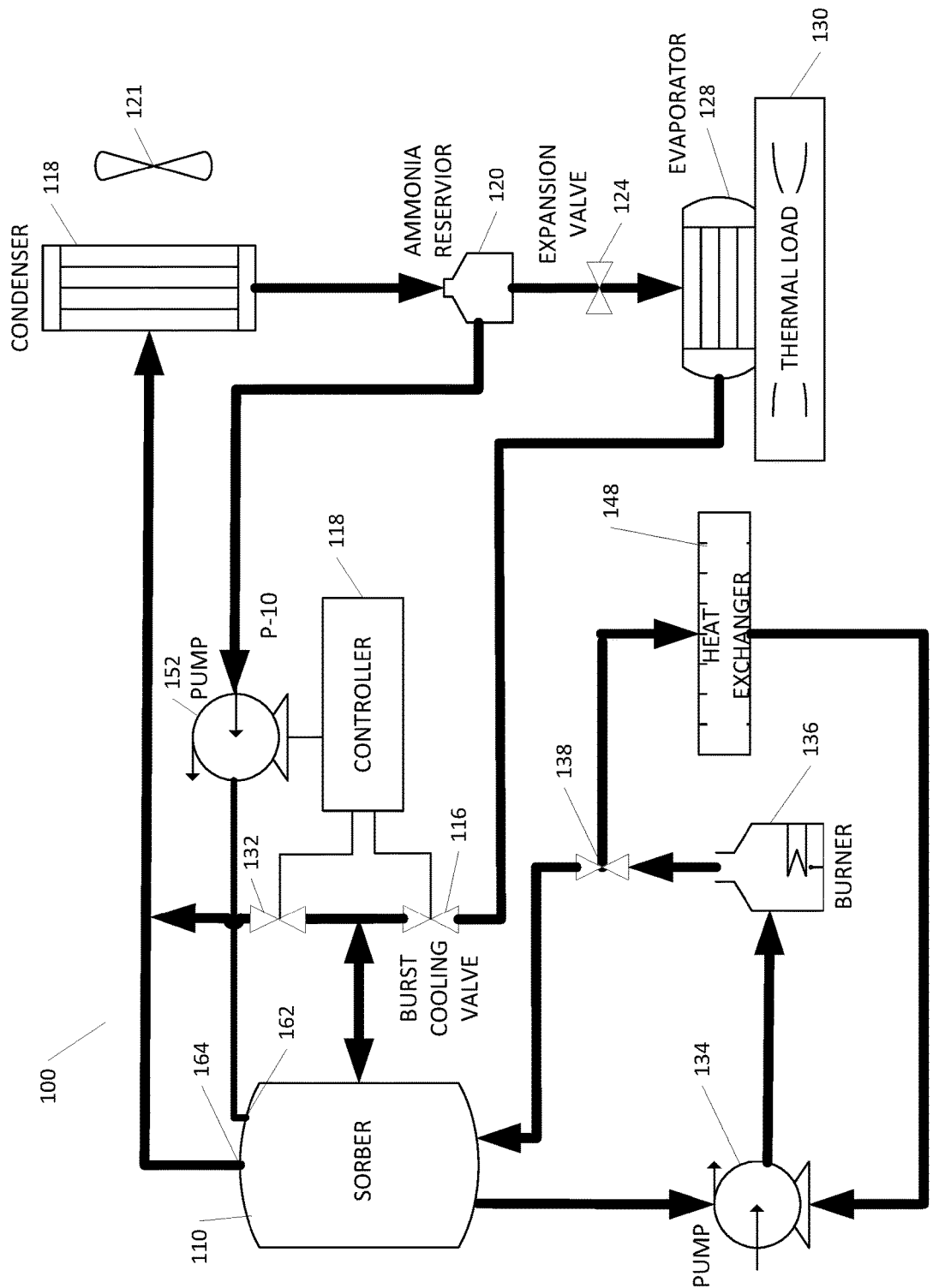
FIG. 3 is a schematic illustration of an embodiment of a burst mode cooling system.

FIG. 3 shows one exemplary burst mode cooling system 100 that has a complex compound based sorber 110 that is designed to absorb and desorb ammonia. Additional details on the sorber 110 can be found with reference to FIG. 4 below. The cycle begins when a burst cooling valve 116 is opened under control of an electronic controller 118. Opening the valve 116 allows condensed ammonia stored in an ammonia reservoir 120 to rapidly expand through an expansion valve 124 and move through an evaporator 128. As the expanding ammonia liquid changes to a gas and moves through the evaporator 128 it absorbs heat from an adjacent thermal load 130. This rapidly cools the thermal load 130. The ammonia liquid that was evaporated to gas by the thermal load 130 moves through the open burst cooling valve and into an inlet/outlet 131 to the sorber 110 where it becomes absorbed onto the complex compounds within the sorber 110.

After the burst cooling is completed, the system needs to drive the absorbed ammonia gas from the complex compounds and so activates a heating pump 134 that can circulate heated thermal media, such as an ethylene glycol and water mixture into the sorber. In one embodiment, the thermal media is approximately 30% ethylene glycol in water, however, other compositions of thermal media are also within the scope of embodiments of this invention. For example, the thermal media may be SYLTHERM™ (Dow Corning Corporation, Midland, Mich.), PARATHERM™ (Paratherm, King of Prussia, Pa.) or similar heat transfer fluids.

Activating the heating pump 134 moves the thermal media into a burner 136 that heats the media to a target temperature. In one embodiment the target temperature is between 125° C. and 140° C. In another embodiment the target temperature is 130° C. The heated thermal media is then pumped through a control valve 138 and into a hot thermal media inlet 140 within the sorber 110. The thermal media flows out of the sorber 110 from a hot thermal media outlet 144 and back to the heating pump 134. The heated thermal media circulates through the sorber 110 for a predetermined period of time to drive off the absorbed ammonia gas so that the sorber can enter another cycle of absorbing ammonia onto its complex compound surface.

To run the heated thermal media efficiently through the sorber 110, the system also includes a heat exchanger 148 that can have heated thermal media flowing through it during times when the sorber 110 does not need to be heated. The control valve 138 is controlled by the controller to switch the flow of thermal media to the heat exchanger 148 when the sorber does not need to be heated, and to the sorber 110 when it's time to heat the sorber within the refrigeration cycle.

The heated ammonia gas moves out the inlet/outlet 131, through an ammonia gas return valve 132, and flows towards a condenser 119 to start an additional cycle. The controller 118 controls the burst cooling valve 116 and the ammonia gas return valve 132 to that ammonia gas enters and exits the sorber properly during each cycle. At the condenser 119, the ammonia gas is cooled by a fan 121 and condensed towards a liquid state before flowing into an ammonia reservoir 124. The ammonia reservoir acts as a holding container for pressurized ammonia gas or liquid prior to being recirculated to the sorber, or used for burst mode cooling.

After the sorber is heated to drive off absorbed ammonia, the sorber needs to cool to be able to absorb ammonia for the next round in the refrigeration cycle. To help cool the sorber, the system includes a cooling pump 152 that circulates ammonia from the ammonia reservoir 120 into a series of cooling thermal media lines within the sorber 110. The cooling pump 152 is activated by the controller 118 and draws ammonia from the reservoir 120 flows it into a thermal media inlet 162 and out a thermal media outlet 164. The ammonia absorbs heat from inside of the sorber 110 and then recirculates that heated ammonia to the condenser 119 to help cool down the sorber for the next round of absorption.

Figure 4:
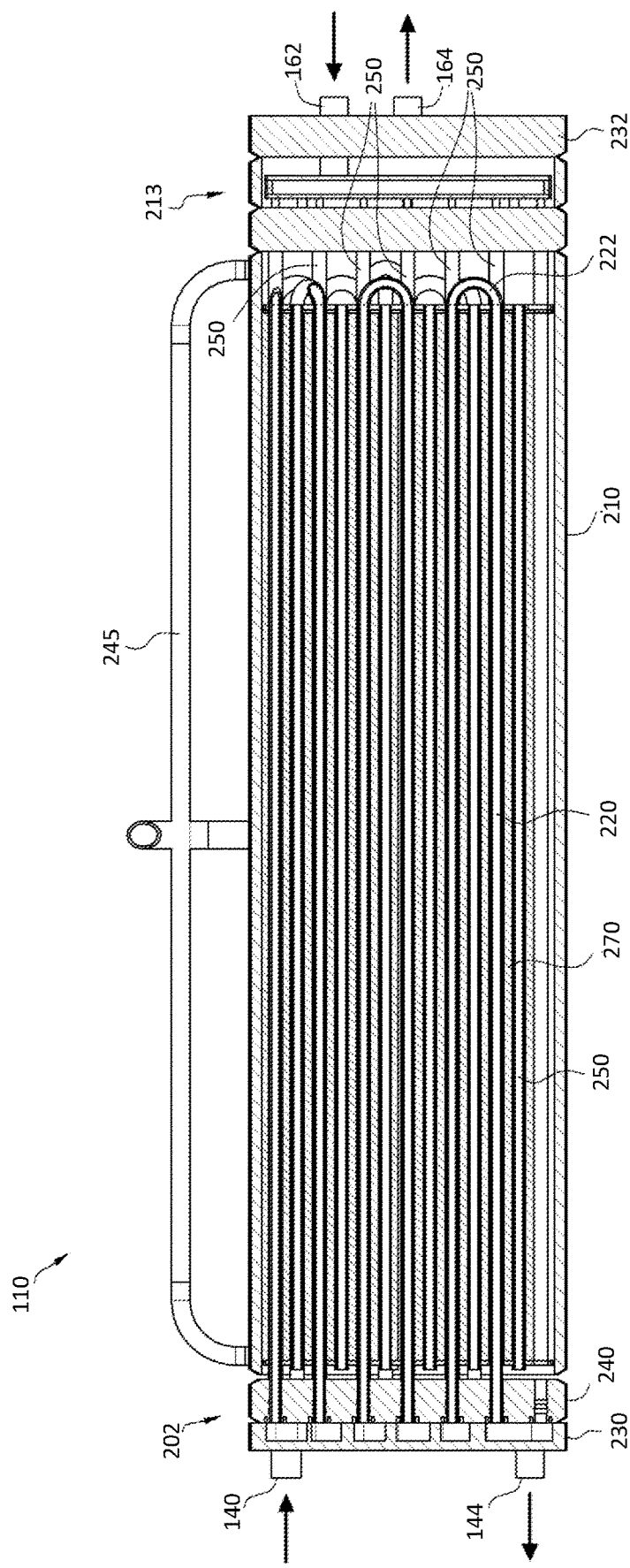
FIG. 4 is a schematic illustration of an embodiment of a sorber that is part of the burst mode cooling system of FIG. 3.

Additional details on the sorber 110 are shown in FIG. 4. The sorber 110 includes a lower end 202 and an upper end 213 that is opposite the lower end 202. The ends 202 and 213 facilitate moving thermal transfer media through a set of heat transfer tubes 220 that traverse the interior of the sorber 110. The lower end 202 includes the hot thermal media inlet 140 and an outlet 144 that communicate with a first circuit of the heat transfer tubes 120. The upper end 213 includes the cold thermal media inlet 162 and an outlet 164 that communicate with a second circuit of the heat transfer tubes 120. The sorber 110 may include other inlets and/or outlets as needed to move thermal transfer media and/or sorber gas through the system. The various inlets and outlets may provide piping or other channels through which the sorber gas and/or refrigerant may flow.

The sorber 110 has an outer shell 210 that is an elongated cylindrical layer that surrounds and encapsulates a complex compound sorbent 270 disposed within the interior of the sorber 110. In some embodiments, the shell 210 may have other suitable shapes and may be composed of more than one layer. The shell 210 may be formed from a rigid material such as a metal or metal alloy, but it may be formed from other suitable materials as well. Among other things, the shell 210 acts as a barrier for the sorbent 270 to prevent the sorbent 270 from expanding radially outward when the sorber 110 is pressurized.

The lower end 202 of the sorber 110 includes a hot water box 230 and a feed box 240. In some embodiments, the hot water box 230 is a fluid bonnet. The hot water box 230 contains a fluid, such as ethylene glycol/water that is then distributed by the feed box 440 through the heat transfer pipes 220 which run adjacent the complex compound sorbent and are used to heat the sorbent to release the ammonia gas.

Similarly, the upper end 213 of the sorber 110 includes a cold box 232. The cold box 232 may be a cooling fluid bonnet. The cold box 232 provides cool fluid, such as ammonia from the reservoir 120 to a second circuit of heat transfer tubes 120 within the sorber 110 to cool the sorber 110 between refrigeration cycles.

By flowing a heat transfer medium 120 through the heat transfer pipes 220, which are adjacent the complex compound material, heat may be transferred to and from the sorbent material. The heat transfer pipes 220 may have bends 222, which may be "U" shaped bends. The bends 222 may be located on either or both of the ends 202, 213 of the sorber 110. In some embodiments, the bends 222 are U-shaped and located near the upper end 213 of the sorber 110. Therefore, in some embodiments the sorber has a dual bonnet design with two circuits for heating and cooling the sorbent material within the sorber 110.

The sorber 110 includes a sorber gas pipe 245 for flowing the sorber gas to and from the sorber 110. The sorber gas flows from the pipe 245 and into the sorber 110 in various locations. In some embodiments, there may only be one location. As shown, the pipe 245 connects with the sorber 110 at three locations along the side of the sorber 110. The pipe 245 may also connect with the sorber 110 in other locations. The sorber gas flows from the pipe 245 and into a set of porous gas distribution tubes 250. In some embodiments, sorber gas flows from the pipe 245 and into compartments (not shown) in the sorber 110 and then into the gas distribution tubes 250. A variety of configurations are possible, and these are just some examples. One embodiment of a sorber can be found in U.S. Patent Publication 2016/0238286 A1 published on Aug. 18, 2016 and incorporated herein by reference for all purposes.

Figure 5:
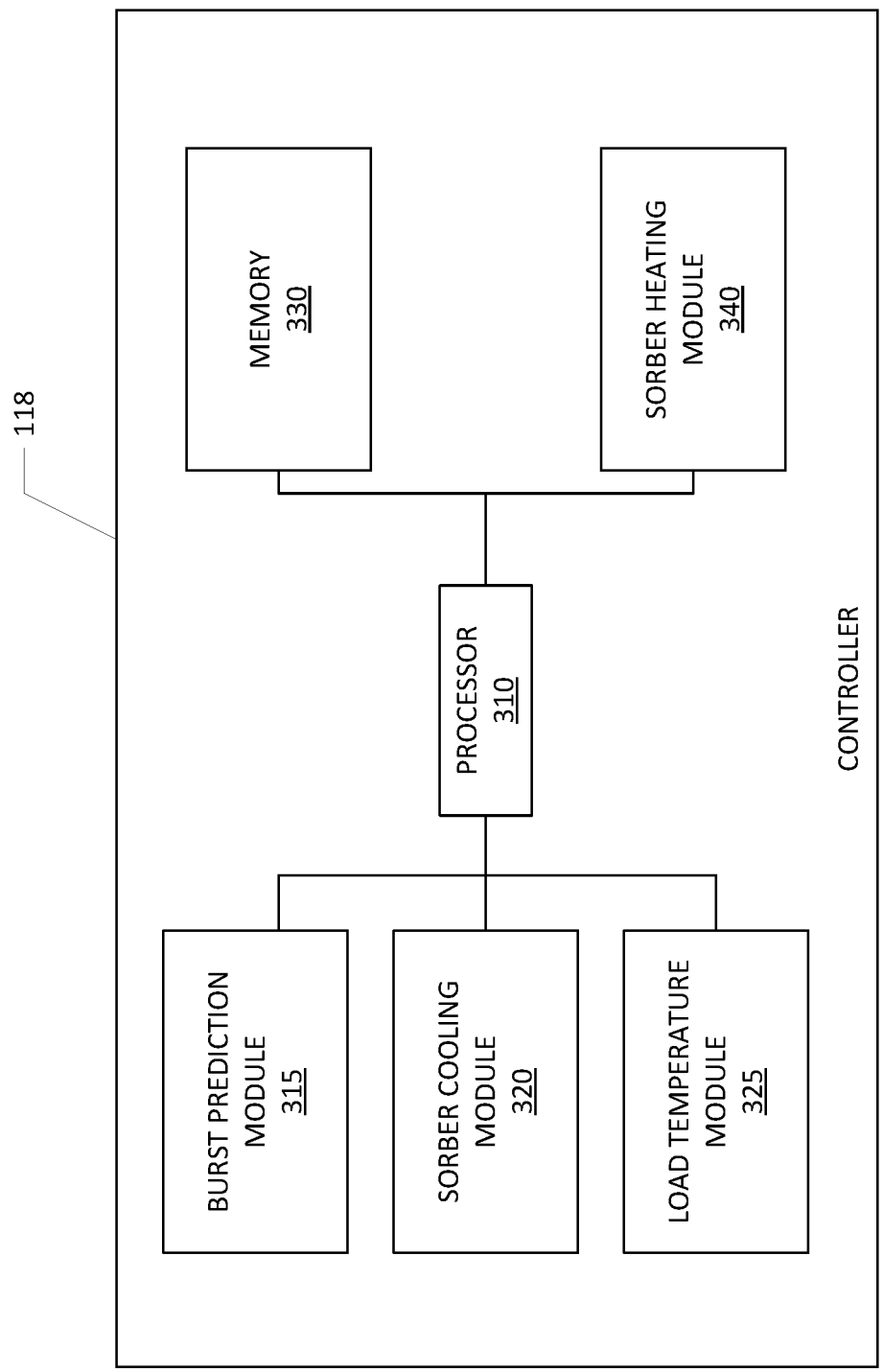
FIG. 5 is a block diagram of an embodiment of a controller that is part of the burst mode cooling system of FIG. 3.

FIG. 5 shows an illustration of the controller 118, which is programmed with instructions to control operations of the system 100. The controller 118 includes a processor 310 which may be any type of well-known microprocessor or microcontroller that is capable of managing the valves, fans and other components of the system 100. The processor 310 is connected to a Burst Mode Module 315 which includes instructions for activating a burst of cooling to the thermal mode under certain predetermined conditions. In one embodiment, the Burst Mode Module 315 is programmed to activate the burst cooling valve 116 to rapidly cool the thermal load 130 when a predetermined signal is received by controller 118. The signal may be an activation signal from a system connected to the thermal load. For example, if the thermal load is a piece of machinery or equipment, it may send a signal to active the burst mode cooling just prior to the machinery or equipment starting a rapid heating cycle. In one embodiment the machinery or equipment may be weapons or other equipment that rapidly heats upon activation. In one embodiment the weapon may be a laser or microwave type weapon that heats in relatively short bursts as the weapon is discharged. With each discharge the weapon system may trigger the burst cooling mode of the system 100 in order to reduce the temperature of the weapon system. In another embodiment, the machinery or equipment may be configured to absorb heat from a mechanical or electrical system that rapidly heats when activated. That mechanical or electrical system may be programmed to trigger the burst mode cooling whenever bursts of energy are used within the mechanical or electrical system so that additional cooling of specific components is warranted.

The controller 118 also includes a sorber cooling module 320 that controls cooling of the sorber after the sorber has been heated to drive the absorbed ammonia from the complex compound sorbent. The sorber cooling module 320 may work in conjunction with the ammonia gas return valve 132 which helps circulate cool ammonia vapor/liquid through the sorber 110 to cool the sorber to a target temperature before initiating a burst mode cooling cycle.

The controller 118 also has a load temperature module which monitors the temperature of the thermal load 130 attached to the evaporator 128. In one embodiment, the load temperature module 325 activates a burst cooling mode when the temperature of the thermal load 130 reaches a predetermined load temperature. For example, when the temperature of the thermal load is above 10° C. and below 50° C., then the load temperature module activates the burst cooling valve to cool the thermal load below its target temperature. In other embodiments, the burst cooling valve may be activated when the temperature of the thermal load is above 15° C. and below 45° C. or above 20° C. and below 40° C. Of course, embodiments are not limited to performing only a single burst cooling procedure. During activation, the thermal load, or an attached weapons system, may request multiple burst mode cooling operations to maintain the temperature of the thermal load below a certain target temperature.

In one embodiment the controller may manage the variable speed operation of various pumps and fans within the system based on the temperature of the thermal load. For example, as the temperature of the thermal load, or surrounding environment, increases the speed of pumps and fans within the system may also increase. Similarly, as the temperature of the thermal load, or surrounding environment decreases, the controller may slow the speed of the pumps and/or fans.

The controller may also include a sorber heating module 340 which is configured to heat the sorber 110 at the proper time in the cooling cycle to drive the ammonia from the complex compound sorbent. The controller may be connected to the valve 138 which determines if the heated liquid flowing through the burner 136 is directed into the sorber 110 or instead to the heat exchanger 148. When the sorber heating module 340 determines that its time to drive off the ammonia gas it can open the valve 138 which allows a heated aqueous mixture to flow through the sorber and heat the sorbent material.

Each of the instructions may be stored in a memory 330 that is connected to the processor 310 within the controller 118.

Figure 6:
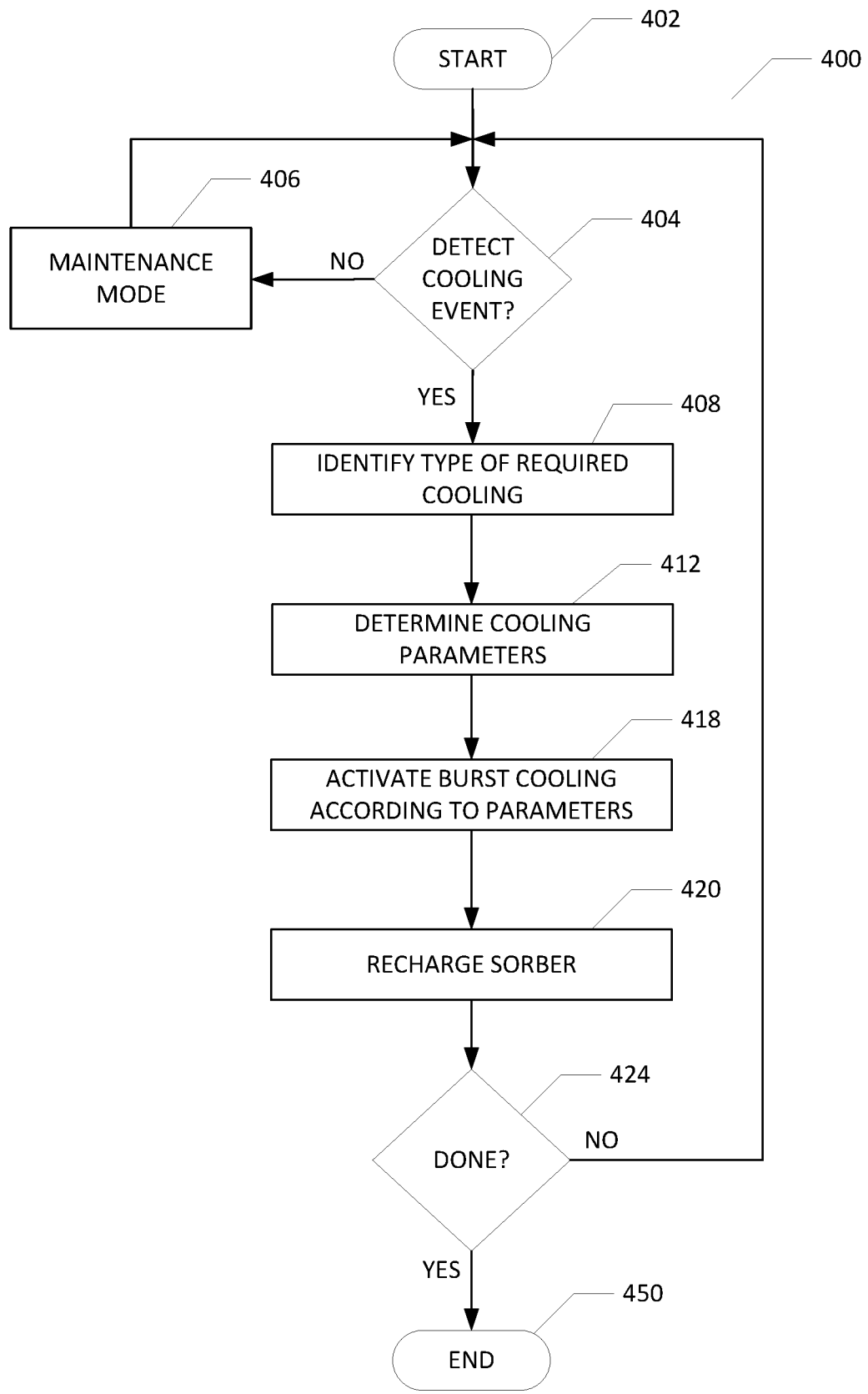
FIG. 6 is a flow diagram of an embodiment of a process for activating a burst cooling feature of the burst mode cooling system of FIG. 3.

FIG. 6 is a flow diagram of a process 400 for performing a burst mode cooling of a thermal load. The process 400 begins at a start state 402 and then moves to a decision state 404 wherein a determination is made whether a cooling event has been detected. A cooling event may be, for example, the determination that the thermal load has reached a target temperature. Another cooling event may be, for example, the receipt of a signal from a machine or equipment attached to the thermal load that it will require burst cooling at an upcoming time. If a determination is made at the decision state 404 that no cooling event has been detected, the process 400 moves to a state 406 where the system enters a maintenance mode where the cooling system can prepare for a next cooling event. For example, the system may use the maintenance mode to drive off ammonia bound to the sorbent from a prior burst cooling event. The system may also start to circulate some of the ammonia from the ammonia reservoir through cooling pipes within the sorber to reduce the temperature of the sorber so it can be prepared for an additional burst cooling procedure. The system may perform other measures within the sorber or system to prepare for a future burst mode cooling procedure. Once the maintenance mode is complete at the state 406, the process 400 returns to the decision state 404 to wait until a cooling event is detected.

If a cooling event is detected at the decision state 404, the process 400 moves to a state 408 wherein the type of required cooling is identified. For example, the system may activate longer or shorter bursts of cooling depending on the type of cooling required by the target load or other machine or equipment. Once the type of cooling is identified at the state 408 the process 400 moves to a state 412 wherein the cooling parameters are determined. The cooling parameters may be the number of burst modes to activate, the over length of the cooling required or any other parameter necessary for the system to properly cool the thermal load.

The process 400 then moves to a state 418 wherein the burst cooling is activated by opening the burst cooling valve 116 according to the determined cooling parameters. After the burst cooling has completed the process 400 moves to a state 420 wherein the sorber is recharged by heating the sorbent to drive off the ammonia that has bound at the prior state. The process 400 then moves to a decision state 424 to determine if the cooling process is completed, and if not then the process 400 returns to the decision state 404 wherein the process 400 waits to detect another cooling event. If the overall process is complete at the decision state 424, then the process terminates at an end state 450.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A burst mode ammonia based cooling system, comprising:
    at least one sorber comprising a complex compound sorbent configured to absorb and desorb ammonia;
    at least one heat source thermally connected to the at least one sorber;
    one or more condensers in fluid communication with the at least one sorber;
    one or more evaporators in fluid communication with the at least one sorber;
    a receiver for an activation signal; and
    a burst mode controller configured to activate a valve in response to receiving an activation signal from the receiver to provide a burst of heat absorption to a thermal load adjacent to the evaporator, where the absorption period of the complex compound is between 5 seconds and 300 seconds and the desorption period is between 180 seconds and 15 minutes, wherein the absorption period is divided into a plurality of pulse periods and rest periods.

2. The system of claim 1, wherein the sorbent is one of $SrCl_2$, $CaBr_2$ and $MnCl_2$.

3. The system of claim 1, wherein the controller is configured to control absorption of ammonia at the lean end of a coordination sphere for the complex compound sorbent.

4. The system of claim 3, wherein the lean end of the coordination sphere is the lower 50% of the coordination sphere.

5. The system of claim 3, wherein the lean end of the coordination sphere is the lower 30% of the coordination sphere.

6. The system of claim 3, wherein the controller is configured to control the absorption of ammonia to a $SrCl_2$ sorbent when three or less moles of ammonia are absorbed to each mole of $SrCl_2$.

7. The system of claim 3, wherein the controller is configured to control the absorption of ammonia to a $SrCl_2$ sorbent when 3.5 or less moles of ammonia are absorbed to each mole of $SrCl_2$.

8. The system of claim 7, wherein the lean end of the coordination sphere for the $SrCl_2$ sorbent is the lower 20% of the coordination sphere.

9. The system of claim 3, wherein the controller is configured to control the absorption of ammonia to a $CaBr_2$ sorbent when three or less moles of ammonia are absorbed to each mole of $CaBr_2$.

10. The system of claim 3, wherein the controller is configured to control the absorption of ammonia to a $CaBr_2$ sorbent when 3.5 or less moles of ammonia are absorbed to each mole of $CaBr_2$.

11. The system of claim 3, wherein the controller is configured to control the absorption of ammonia to a $MnCl_2$ sorbent when three or less moles of ammonia are absorbed to each mole of $MnCl_2$.

12. The system of claim 3, wherein the controller is configured to control the absorption of ammonia to a $MnCl_2$ sorbent when 3.5 or less moles of ammonia are absorbed to each mole of $MnCl_2$.

13. The system of claim 1, wherein the plurality of pulse periods are between 5 and 30 seconds long each.

14. The system of claim 1, wherein the absorption period is 30 seconds, which is made up of three pulse periods of absorption for five seconds each, with a five second rest period between each pulse period.

15. The system of claim 1, wherein the thermal mass of the system is less than 7:1, which is the ratio of the total mass (kilograms) of the reactor to the total mass (kilograms) of the complex compound sorbent.

16. The system of claim 1, wherein the sorber comprises a plurality of porous gas distribution tubes for distributing the ammonia to the complex compound sorbent.

17. The system of claim 1, wherein the evaporator is configured to mate with a thermal load from a product or device.

18. The system of claim 17, wherein the thermal load is part of a flash freezing device or product.

19. The system of claim 17, wherein the thermal load is part of a directed energy weapons system.

20. The system of claim 1, wherein the controller is linked to a temperature sensor and activates a burst mode cooling cycle when the temperature sensor reaches a predetermined target temperature.

21. The system of claim 1, wherein the controller is linked to an activation signal, that triggers a burst mode cooling cycle.

22. The system of claim 21, wherein the activation signal is activated by a predictive process that determines when to activate a burst mode cooling cycle.

23. The system of claim 1, wherein the at least one sorber comprises three sorbers.

24. A method in a complex compound sorber system of burst mode cooling a thermal load, comprising:
    detecting when to activate a burst mode cooling cycle based on receipt of an activation signal from a receiver;

activating a valve that allows ammonia to flow into at least one sorber, comprising a complex compound sorbent, wherein the sorber is connected to an evaporator and the activation provides a burst of heat absorption at the evaporator; and controlling an absorption period of the complex compound to between 5 seconds and 300 seconds, wherein the absorption period is divided into a plurality of pulse periods and rest periods; and controlling a desorption period of the complex compound to between 180 seconds and 15 minutes.

25. The method of claim 24, wherein the at least one sorber comprises a complex compound sorbent that is one of $SrCl_2$, $CaBr_2$ and $MnCl_2$.

26. The method of claim 24, wherein controlling the absorption period comprises controlling the absorption of ammonia so it binds to the complex compound sorbent at the lean end of a coordination sphere.

27. The method of claim 26, wherein the sorbent comprises $SrCl_2$ and the lean end of the coordination sphere for the $SrCl_2$ sorbent is the lower 20% of the coordination sphere.

28. The method of claim 26, wherein controlling the absorption period comprises controlling the absorption of ammonia to a $SrCl_2$ sorbent when three or less moles of ammonia molecules are absorbed to each mole of $SrCl_2$.

29. The method of claim 26, wherein controlling the absorption period comprises controlling the absorption of ammonia to a $SrCl_2$ sorbent when 3.5 or less moles of ammonia molecules are absorbed to each mole of $SrCl_2$.

30. The method of claim 26, wherein the lean end of the coordination sphere is the lower 50% of the coordination sphere.

31. The method of claim 26, wherein the lean end of the coordination sphere is the lower 30% of the coordination sphere.

32. The method of claim 26, wherein controlling the absorption period comprises controlling the absorption of ammonia to a $CaBr_2$ sorbent when three or less moles of ammonia molecules are absorbed to each mole of $CaBr_2$.

33. The method of claim 26, wherein controlling the absorption period comprises controlling the absorption of ammonia to a $CaBr_2$ sorbent when 3.5 or less moles of ammonia molecules are absorbed to each mole of $CaBr_2$.

34. The method of claim 26, wherein controlling the absorption period comprises controlling the absorption of ammonia to a $MnCl_2$ sorbent when three or less moles of ammonia molecules are absorbed to each mole of $MnCl_2$.

35. The method of claim 26, wherein controlling the absorption period comprises controlling the absorption of ammonia to a $MnCl_2$ sorbent when 3.5 or less moles of ammonia molecules are absorbed to each mole of $MnCl_2$.

36. The system of claim 1, wherein the activation signal is from a temperature sensor.

37. The system of claim 1, wherein the activation signal is from a system connected to the thermal load.

38. The method of claim 24, wherein the activation signal is from a temperature sensor.

39. The method of claim 24, wherein the activation signal is from a system connected to the thermal load.

* * * * *